(12) United States Patent
Ito et al.

(10) Patent No.: US 7,034,896 B2
(45) Date of Patent: Apr. 25, 2006

(54) GRADATION CORRECTION APPARATUS

(75) Inventors: Keiichi Ito, Osaka (JP); Atsuhisa Kageyama, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 532 days.

(21) Appl. No.: 10/343,512

(22) PCT Filed: May 30, 2002

(86) PCT No.: PCT/JP02/05314

§ 371 (c)(1),
(2), (4) Date: Jan. 31, 2003

(87) PCT Pub. No.: WO02/102059

PCT Pub. Date: Dec. 19, 2002

(65) Prior Publication Data

US 2003/0156225 A1    Aug. 21, 2003

(51) Int. Cl.
*H04N 9/69* (2006.01)
(52) U.S. Cl. ............. 348/675; 348/679; 348/712
(58) Field of Classification Search ........... 348/674, 348/675, 677–679, 690–692, 712, 708, 254–257; 358/519; 382/167; H04N 5/202, 9/69, 5/16, H04N 9/72
See application file for complete search history.

(56) References Cited

U.S. PATENT DOCUMENTS

| 6,215,529 B1 | 4/2001 | Sugimoto et al. ........... 348/675 |
| 6,633,343 B1 * | 10/2003 | Ito et al. ..................... 348/674 |

FOREIGN PATENT DOCUMENTS

| EP | 0 459 366 A2 | 12/1991 |
| JP | 01300773 A | 12/1989 |
| JP | 4-37263 | 2/1992 |
| JP | 10248024 A | 9/1998 |
| JP | 2001136411 A | 5/2001 |

* cited by examiner

*Primary Examiner*—Sherrie Hsia
(74) *Attorney, Agent, or Firm*—Steptoe & Johnson LLP

(57) ABSTRACT

The present invention provides a gradation correction device which can perform gradation correction using digital feedback processing, and furthermore, can control the digital feedback processing with high accuracy. The gradation correction device is provided with a correction gain adjustable amount generation circuit (103) and a correction gain generation circuit (104), and the correction gain adjustable amount generation circuit (103) obtains a correction gain adjustable amount which is non-linear in relation to a difference S between a reference luminance level Yb1 and a maximum luminance level, and greater gamma correction is carried out as the value of the difference S is larger.

6 Claims, 16 Drawing Sheets

(PRIOR ART)

GRADATION CORRECTION APPARATUS

TECHNICAL FIELD

The present invention relates to a gradation correction device for performing gradation correction on a luminance signal of an image in equipment for displaying an image and, more particularly, to a gradation correction device having a construction for digitally performing feedback correction that has conventionally been carried out in analog fashion.

BACKGROUND ART

In recent years, as color television receivers have been increased in size, many color television receivers are provided with gradation correction devices such as a black level correction circuit for expanding the gradation of a luminance signal of an image toward the black side or a gamma correction circuit, in order to display the image more clearly and dynamically. Further, in order to improve the accuracy of gradation correction, digital signal processing techniques have increasingly been employed.

FIG. 18 is a block diagram illustrating a conventional gradation correction device for a luminance signal, which is disclosed in Japanese Published Patent Application No. Hei.4-37263. The gradation correction device shown in FIG. 18 is provided with a maximum luminance level detection circuit 1401; a comparison circuit 1402 for comparing the output of the maximum luminance level detection circuit 1401 with a reference value; a gamma correction circuit 1403 for performing gamma correction on the basis of the output of the comparison circuit 1402; a matrix circuit 1404 for supplying R, G, and B signals to a cathode ray tube (CRT); and the CRT 1405.

Hereinafter, the operation will be described. The maximum luminance level detection circuit 1401 receives an output luminance signal B, detects a maximum luminance level C within one field of the output luminance signal B, and outputs it to the comparison circuit 1402.

The comparison circuit 1402 compares the maximum luminance level C with a reference luminance level D which is supplied from the outside, and outputs a comparison signal E to the gamma correction circuit 1403.

The gamma correction circuit 1403 controls a gamma correction gain according to the value of the comparison signal E, performs gamma correction on an input luminance signal A, and outputs an output luminance signal B having a gamma correction characteristic as shown in FIG. 19(a) or 19(b). That is, when the maximum luminance level C is larger than the reference luminance level D, gamma correction for suppressing the white-side gradation is carried out as shown in FIG. 19(a), and when the maximum luminance level C is smaller than the reference luminance level D, inverse gamma correction for expanding the white-side gradation is carried out as shown in FIG. 19(b), whereby an output luminance signal B is obtained to be outputted to the matrix circuit 1404.

The matrix circuit 1404 performs a matrix operation on the output luminance signal B and a chrominance signal Cin to obtain output signals R (red), G (green), and B (blue), and outputs these signals to the CRT 1405.

Then, the CRT 1405 is driven by the output signals R, G, and B, thereby obtaining a gradation-corrected image.

In the conventional gradation correction device constituted as described above, comparison between the maximum luminance level C outputted from the maximum luminance level detection circuit 1404 and the reference luminance level D is performed by the comparison circuit 1402, and the gamma correction gain is controlled according to the comparison signal E, whereby gradation correction is carried out by analog feedback control such that the output luminance signal B becomes equal to the reference luminance signal D. However, as described above, in a rising tide of digitization of video signal processing in recent years, there is a necessity of shifting the feedback control which has been carried out in analog fashion by the conventional gradation correction device, to feedback control in digital fashion.

The present invention is made in view of the existing situation described above and has for its object to provide a gradation correction device that can perform gradation correction using feedback processing even in digital fashion, and that can perform control with high accuracy.

DISCLOSURE OF THE INVENTION

A gradation correction device according to one embodiment of the present invention corrects an input luminance signal of an image according to an output luminance signal so that an output having a predetermined characteristic in relation to the input luminance signal can be obtained, which device comprises: a maximum output luminance level detection means for detecting a maximum output luminance level of the output luminance signal which has already been gradation-corrected; a first subtraction means for calculating a difference value between the maximum output luminance level which is outputted from the maximum output luminance level detection means, and a first reference luminance level which is supplied from the outside; a correction gain adjustable amount generation means for outputting a predetermined adjustable amount according to the difference value, on the basis of a characteristic curve such that a change in the adjustable amount to be outputted is increased as the absolute value of the difference value outputted from the first subtraction means becomes larger; a correction gain generation means for adding or subtracting the adjustable amount outputted from the correction gain adjustable amount generation means to/from the current correction gain, and outputting the result as a correction gain; a gamma correction signal generation means for generating a gamma correction signal for the input luminance signal, on the basis of a second reference luminance level which is supplied from the outside; a multiplication means for multiplying the gamma correction signal outputted from the gamma correction signal generation means by the correction gain outputted from the correction gain generation means, and outputting the result as a gamma correction amount; and a second subtraction means for subtracting the gamma correction amount outputted from the multiplication means, from the input luminance signal, thereby performing gamma correction on the input luminance signal.

According to a further embodiment of the present invention, in the gradation correction device as defined above, a blooming luminance level that is a luminance level at which an image displayed on an image receiving tube blooms is employed as the first reference luminance level and the second reference luminance level.

According to a further embodiment of the present invention, the gradation correction device as defined above further comprises: a maximum input luminance level detection means for detecting a maximum luminance level of the input luminance signal; a comparison means for comparing the maximum input luminance level outputted from the maximum input luminance level detection means, with the first reference luminance level; an addition means for adding the gamma correction amount outputted from the multiplication means to the input luminance signal, thereby performing gamma correction on the input luminance signal; and an output selection means for selecting either the output of the second subtraction means or the output of the addition means according to the result of the comparison by the comparison means, and outputting the selected one; wherein, when the maximum input luminance level is larger than the first reference luminance level in the comparison means, the output of the second subtraction means is selected by the selection means and outputted to perform gamma correction; on the other hand, when the maximum input luminance level is smaller than the first reference luminance level, the output of the addition means is selected by the selection means and outputted to perform inverse gamma correction for expanding the white-side gradation of the luminance signal.

A gradation correction device according to an embodiment of the present invention corrects an input luminance signal of an image according to an output luminance signal so that an output having a predetermined characteristic in relation to the input luminance signal can be obtained, which device comprises: a minimum output luminance level detection means for detecting a minimum output luminance level of the output luminance signal which has already been gradation-corrected; a first subtraction means for calculating a difference value between the minimum output luminance level which is outputted from the minimum output luminance level detection means, and a first reference luminance level which is supplied from the outside; a correction gain adjustable amount generation means for outputting a predetermined adjustable amount according to the difference value, on the basis of a characteristic curve such that a change in the adjustable amount to be outputted is increased as the absolute value of the difference value outputted from the first subtraction means becomes larger; a correction gain generation means for adding or subtracting the adjustable amount outputted from the correction gain adjustable amount generation means to/from the current correction gain, and outputting the result as a correction gain; a black level correction signal generation means for generating a black level correction signal for the input luminance signal, on the basis of a second reference luminance level which is supplied from the outside; a multiplication means for multiplying the black level correction signal outputted from the black level correction signal generation means, by the correction gain outputted from the correction gain generation means, and outputting the result as a black level correction amount; and a second subtraction means for subtracting the black level correction amount outputted from the multiplication means, from the input luminance signal, thereby performing black level correction on the input luminance signal.

According to an embodiment of the present invention, the gradation correction device as defined above further comprises: a minimum output luminance level detection means for detecting a minimum output luminance level of the output luminance signal which has already been gradation-corrected; a third subtraction means for calculating a difference value between the minimum output luminance level which is outputted from the minimum output luminance level detection means, and a third reference luminance level which is supplied from the outside; a black level correction signal generation means for generating a black level correction signal for the input luminance signal outputted from the second subtraction means, on the basis of a fourth reference luminance level which is supplied from the outside; a second multiplication means for multiplying a second correction gain which is obtained by the correction gain adjustable amount generation means and the correction gain generation means, by the output of the black level correction signal generation means, on the basis of the absolute value of the difference value which is outputted from the third subtraction means; and a fourth subtraction means for subtracting the output of the second multiplication means from the output of the second subtraction means, thereby performing black level correction on the luminance signal which has already been gamma-corrected.

According to an embodiment of the present invention, the gradation correction device as defined above further comprises: a maximum output luminance level detection means for detecting a maximum output luminance level of the output luminance signal which has already been gradation-corrected; a third subtraction means for calculating a difference value between the maximum output luminance level which is outputted from the maximum output luminance level detection means, and a third reference luminance level which is supplied from the outside; a gamma correction signal generation means for generating a gamma correction signal for the luminance signal which is outputted from the second subtraction means, on the basis of a fourth reference luminance level which is supplied from the outside; a second multiplication means for multiplying a second correction gain which is obtained by the correction gain adjustable amount generation means and the correction gain generation means, by the output of the gamma correction signal generation means, on the basis of the absolute value of the difference value which is outputted from the third subtraction means; and a fourth subtraction means for subtracting the output of the second multiplication means from the output of the second subtraction means, thereby performing gamma correction on the luminance signal whose black level has already been corrected.

As described above, according to one embodiment of the present invention, there is provided a gradation correction device for correcting an input luminance signal of an image according to an output luminance signal so that an output having a predetermined characteristic in relation to the input luminance signal can be obtained, which device comprises: a maximum output luminance level detection means for detecting a maximum output luminance level of the output luminance signal which has already been gradation-corrected; a first subtraction means for calculating a difference value between the maximum output luminance level which is outputted from the maximum output luminance level detection means, and a first reference luminance level which is supplied from the outside; a correction gain adjustable amount generation means for outputting a predetermined adjustable amount according to the difference value, on the basis of a characteristic curve such that a change in the adjustable amount to be outputted is increased as the absolute value of the difference value outputted from the first subtraction means becomes larger; a correction gain generation means for adding or subtracting the adjustable amount outputted from the correction gain adjustable amount generation means to/from the current correction gain, and outputting the result as a correction gain; a gamma correction signal generation means for generating a gamma correction signal for the input luminance signal, on the basis of a second reference luminance level which is supplied from the outside; a multiplication means for multiplying the gamma correction signal outputted from the gamma correction signal generation means by the correction gain outputted from the correction gain generation means, and outputting the result as a gamma correction amount; and a second subtraction means for subtracting the gamma correction amount outputted from the multiplication means, from the input luminance signal, thereby performing gamma correction on the input luminance signal. Therefore, the luminance signal can be converged into a predetermined luminance level with high responsivity even in digital feedback control, and gamma correction, which is one of gradation corrections that have conventionally been performed in analog feedback control, can be realized by digital feedback control.

According to an embodiment of the present invention, in the gradation correction device according to the description above, a blooming luminance level that is a luminance level at which an image displayed on an image receiving tube blooms is employed as the first reference luminance level and the second reference luminance level. Therefore, the maximum output luminance level of the output luminance signal is prevented from becoming larger than the blooming luminance level, thereby performing gradation correction which is effective at reducing blooming that is a phenomenon unique to a CRT.

According to an embodiment of the present invention, the gradation correction device according to the description above further comprises: a maximum input luminance level detection means for detecting maximum luminance level of the input luminance signal; a comparison means for comparing the maximum input luminance level outputted from the maximum input luminance level detection means, with the first reference luminance level; an addition means for adding the gamma correction amount outputted from the multiplication means to the input luminance signal, thereby performing gamma correction on the input luminance signal; and an output selection means for selecting either the output of the second subtraction means or the output of the addition means according to the result of the comparison by the comparison means, and outputting the selected one; wherein, when the maximum input luminance level is larger than the first reference luminance level in the comparison means, the output of the second subtraction means is selected by the selection means and outputted to perform gamma correction; on the other hand, when the maximum input luminance level is smaller than the first reference luminance level, the output of the addition means is selected by the selection means and outputted to perform inverse gamma correction for expanding the white-side gradation of the luminance signal. Therefore, the white-side dynamic range of the image signal can be enlarged, whereby a clearer and more dynamic image can be obtained.

According to an embodiment of the present invention, there is provided a gradation correction device for correcting an input luminance signal of an image according to an output luminance signal so that an output having a predetermined characteristic in relation to the input luminance signal can be obtained, which device comprises: a minimum output luminance level detection means for detecting a minimum output luminance level of the output luminance signal which has already been gradation-corrected; a first subtraction means for calculating a difference value between the minimum output luminance level which is outputted from the minimum output luminance level detection means, and a first reference luminance level which is supplied from the outside; a correction gain adjustable amount generation means for outputting a predetermined adjustable amount according to the difference value, on the basis of a characteristic curve such that a change in the adjustable amount to be outputted is increased as the absolute value of the difference value outputted from the first subtraction means becomes larger; a correction gain generation means for adding or subtracting the adjustable amount outputted from the correction gain adjustable amount generation means to/from the current correction gain, and outputting the result as a correction gain; a black level correction signal generation means for generating a black level correction signal for the input luminance signal, on the basis of a second reference luminance level which is supplied from the outside; a multiplication means for multiplying the black level correction signal outputted from the black level correction signal generation means, by the correction gain outputted from the correction gain generation means, and outputting the result as a black level correction amount; and a second subtraction means for subtracting the black level correction amount outputted from the multiplication means, from the input luminance signal, thereby performing black level correction on the input luminance signal. Therefore, the luminance signal can be converged into a predetermined luminance level with high responsivity even in digital feedback control, and black level correction, which is one of gradation corrections that have conventionally been performed in analog feedback control, can be realized by digital feedback control.

According to an embodiment of the present invention, the gradation device according to the description above further comprises: a minimum output luminance level detection means for detecting a minimum output luminance level of the output luminance signal which has already been gradation-corrected; a third subtraction means for calculating a difference value between the minimum output luminance level which is outputted from the minimum output luminance level detection means, and a third reference luminance level which is supplied from the outside; a black level correction signal generation means for generating a black level correction signal for the input luminance signal outputted from the second subtraction means, on the basis of a fourth reference luminance level which is supplied from the outside; a second multiplication means for multiplying a second correction gain which is obtained by the correction gain adjustable amount generation means and the correction gain generation means, by the output of the black level correction signal generation means, on the basis of the absolute value of the difference value which is outputted from the third subtraction means; and a fourth subtraction means for subtracting the output of the second multiplication means from the output of the second subtraction means, thereby performing black level correction on the luminance signal which has already been gamma-corrected. Therefore, both of black-side and white-side gradations of the input luminance signal can be corrected, whereby a clearer and more dynamic image can be obtained.

According to an embodiment of the present invention, the gradation correction device according to the description above further comprises: a maximum output luminance level detection means for detecting a maximum output luminance level of the output luminance signal which has already been gradation-corrected; a third subtraction means for calculating a difference value between the maximum output luminance level which is outputted from the maximum output luminance level detection means, and a third reference luminance level which is supplied from the outside; a gamma correction signal generation means for generating a gamma correction signal for the luminance signal which is outputted from the second subtraction means, on the basis of a fourth reference luminance level which is supplied from the outside; a second multiplication means for multiplying a second correction gain which is obtained by the correction gain adjustable amount generation means and the correction gain generation means, by the output of the gamma correction signal generation means, on the basis of the absolute value of the difference value which is outputted from the third subtraction means; and a fourth subtraction means for subtracting the output of the second multiplication means from the output of the second subtraction means, thereby performing gamma correction on the luminance signal whose black level has already been corrected. Therefore, both of black-side and white-side gradations of the input luminance signal can be corrected, whereby a clearer and more dynamic image can be obtained.

BRIEF DESCRIPTION OF DRAWINGS

FIG. 10($b$) is a diagram illustrating the relationship between an input luminance signal Yin and an output luminance signal Yo according to the second embodiment (in the case where Ymax2<Yb1).

FIG. 19($b$) is a diagram illustrating the I/O characteristic of the conventional gradation correction device for a luminance signal (in the case where maximum luminance level C<reference luminance level D).

BEST MODE TO EXECUTE THE INVENTION

EMBODIMENT 1

Figure 1:
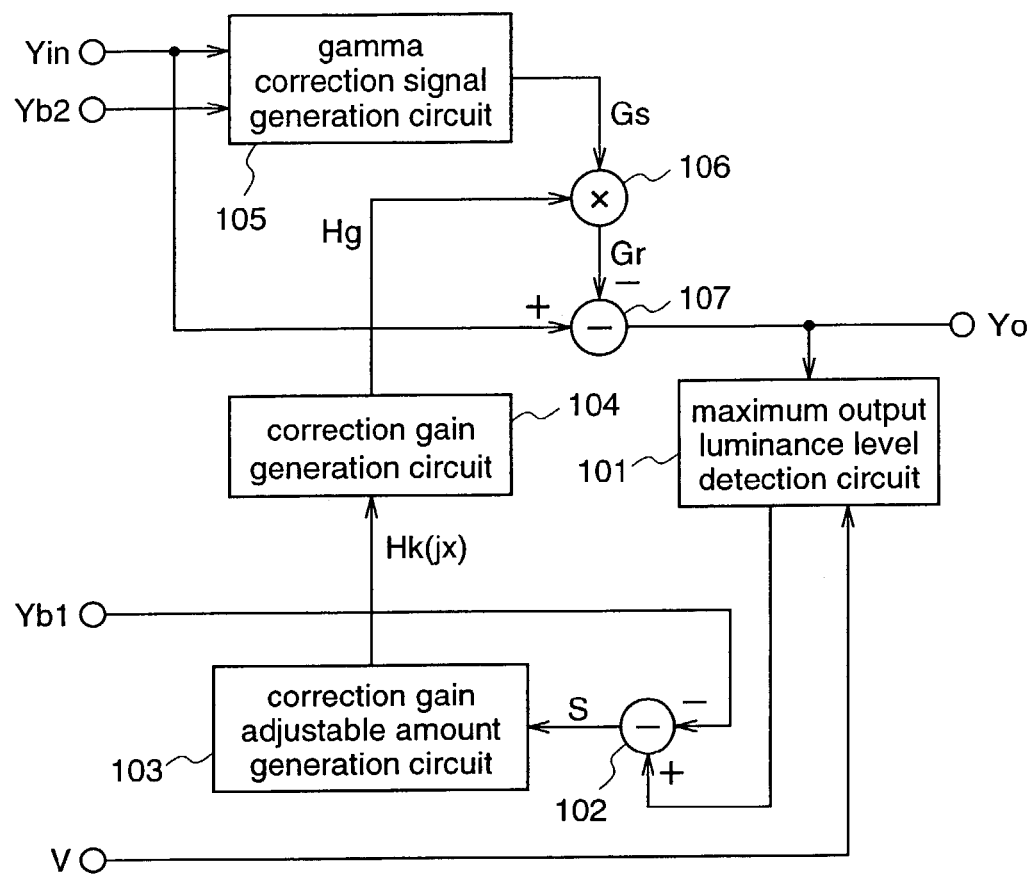
FIG. 1 is a block diagram illustrating the construction of a gradation correction device according to a first embodiment of the present invention.

Hereinafter, a gradation correction device according to a first embodiment of the present invention will be described with reference to the drawing.

FIG. 1 is a block diagram illustrating the construction of a gradation correction device according to the first embodiment. With reference to FIG. 1, the gradation correction device is provided with a maximum output luminance level detection circuit 101 for detecting a maximum luminance level of an output luminance signal Yo; a first subtraction circuit 102 for subtracting a first reference luminance level Yb1 from the output of the maximum output luminance level detection circuit 101; a correction gain adjustable amount generation circuit 103 for calculating a correction gain adjustable amount on the basis of the output of the first subtraction circuit 102; a correction gain generation circuit 104 for generating a correction gain that is a function according to the calculation result of the correction gain adjustable amount generation circuit 103; a gamma correction signal generation circuit 105 for receiving an input luminance signal Yin and a second reference luminance signal Yb2, and generating a gamma correction signal; a multiplication circuit 106 for multiplying the output Gs of the gamma correction signal generation circuit 105 by the output Hg of the correction gain generation circuit 104; and a second subtraction circuit 107 for subtracting the output Gr of the multiplication circuit 106 from the input luminance signal Yin. In FIG. 1, V is a vertical sync signal which is input to the maximum output luminance level detection circuit 101.

Hereinafter, the operation of the gradation correction device constructed as described above will be described with reference to a flowchart shown in FIG. 2.

When processing is started, in step S200, the maximum output luminance level detection circuit 101 detects a maximum output luminance level Ymax within one field of the output luminance signal Yo, and outputs it to the first subtraction circuit 102. A maximum luminance level within several fields of the output luminance signal Yo may be obtained as a maximum output luminance level Ymax.

In step S201, the first subtraction circuit 102 calculates a difference value S between the maximum output luminance level Ymax and the first reference luminance level Yb1 that is supplied from the outside, as follows, $$S = Y\max - Yb1 \qquad (1)$$

and outputs it to the correction gain adjustable amount generation circuit 103.

In step S202, the correction gain adjustable amount generation circuit 103 performs control such that an adjustable amount Hk of a correction gain Hg is increased as an absolute value |S| of the difference value S becomes larger, and conversely, the adjustable amount Hk of the correction gain Hg is decreased as the absolute value |S| becomes smaller, and outputs the adjustable amount Hk to the correction gain generation circuit 104. At this time, the sign (positive or negative) of the difference value S is also transmitted to the correction gain generation circuit 104. Hereinafter, the operation of the correction gain adjustable amount generation circuit 103 will be described with reference to the drawing.

Figure 2:
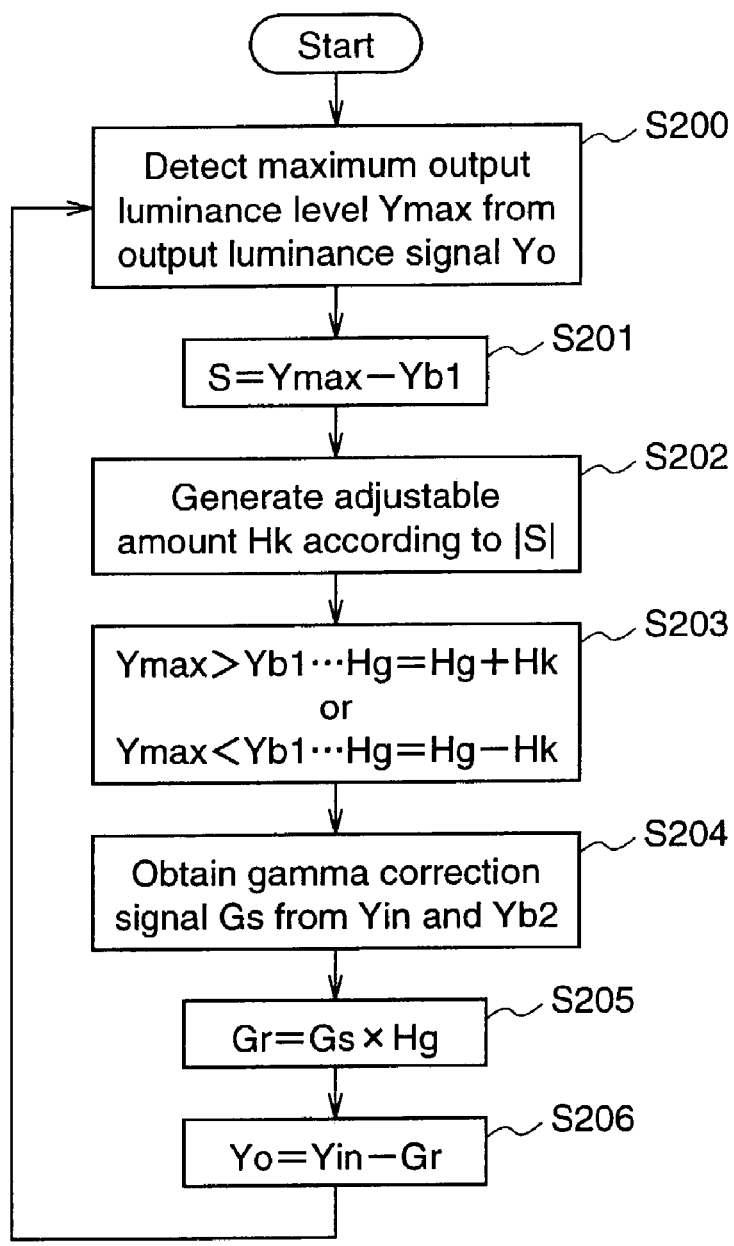
FIG. 2 is a diagram illustrating a flowchart for explaining the operation of the whole gradation correction device according to the first embodiment.
Figure 3:
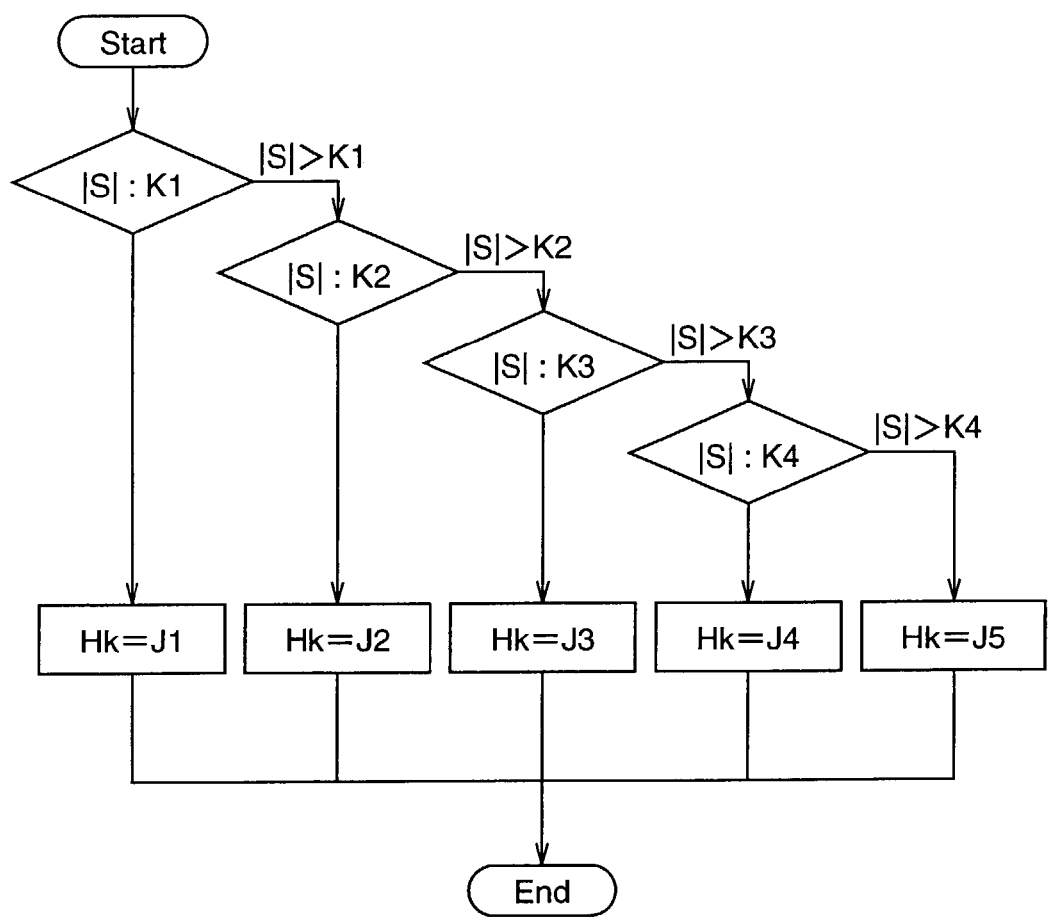
FIG. 3 is a diagram illustrating a flowchart for explaining a method for generating an adjustable amount Hk in a correction gain adjustable amount generation circuit of the gradation correction device according to the first embodiment.

FIG. 3 is a flowchart for explaining a method of generating an adjustable amount Hk in the correction gain adjustable amount generation circuit. In FIG. 3, K1, K2, K3, and K4 (K1<K2<K3<K4) are arbitrarily settable comparison levels to be used for determining the size of the absolute value |S|, and J1, J2, J3, and J4 (J1<J2<J3<J4) are adjustable amounts Hk that are adaptive to the size of the absolute value |S|. The values of J1~J4 can be arbitrarily set. The adjustable amount Hk takes any of the values J1~J4 according to the size of the absolute value |S|, on the basis of the flow shown in FIG. 2.

Figure 4:
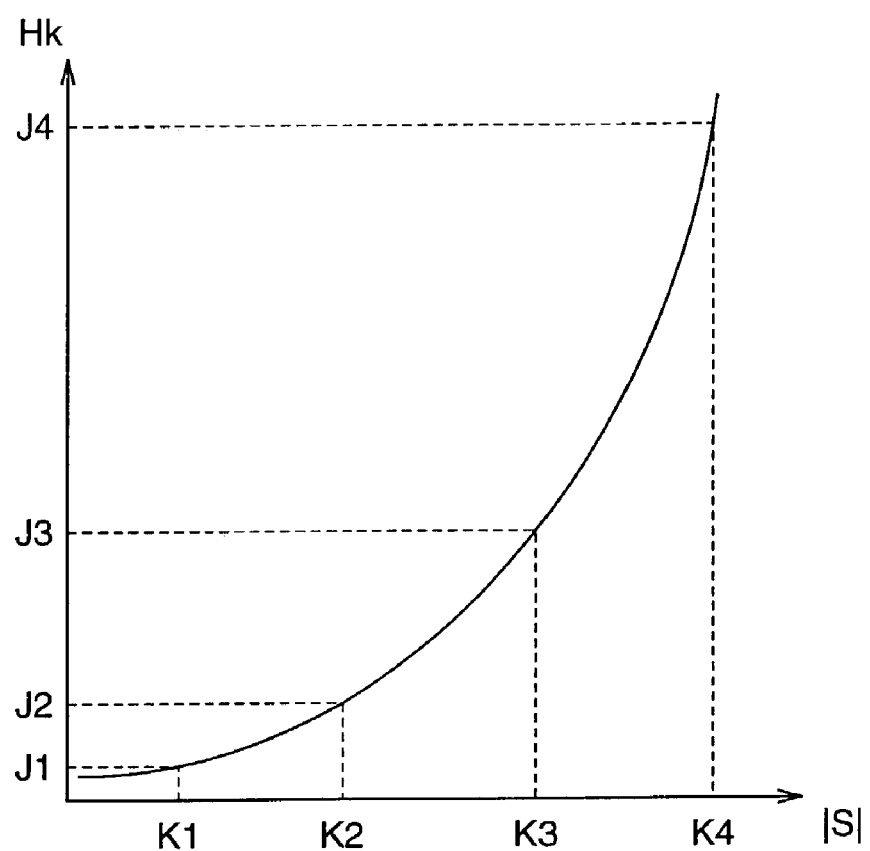
FIG. 4 is a diagram illustrating an example of the relationship between an adjustable amount Hk and an absolute value |S|, in the correction gain adjustable amount generation circuit of the gradation correction device according to the first embodiment.

FIG. 4 shows an example of the relationship between the adjustable amount Hk and the absolute value |S| in the correction gain adjustable amount generation circuit 103.

As shown in FIG. 4, the correction gain adjustable amount generation circuit 103 functions so as to increase the adjustable amount Hk as the absolute value |S| is larger, and decrease the adjustable amount Hk as the absolute value |S| is smaller.

In step S203, the correction gain generation circuit 104 obtains a new correction gain Hg by adding or subtracting the adjustable amount Hk to/from the current correction gain Hg, according to the result of comparison between the maximum output luminance level Ymax and the first reference luminance level Yb1, and outputs the new correction gain Hg to the multiplication circuit 106. To be specific, when the maximum output luminance level Ymax is larger than the first reference luminance level Yb1, the correction gain generation circuit 104 obtains the correction gain Hg as follows, $$Hg = Hg + Hk \qquad (2)$$

thereby to increase the correction gain. Conversely, when the maximum output luminance level Ymax is smaller than the first reference luminance level Yb1, the correction gain generation circuit 104 obtains the correction gain Hg as follows, $$Hg = Hg - Hk \qquad (3)$$

thereby to decrease the correction gain.

When the Ymax is equal to the Yb1, since the feedback is converged, the adjustable amount Hk becomes zero and the size of the correction gain Hg becomes constant.

In step S204, the gamma correction signal generation circuit 105 obtains a gamma correction signal Gs corresponding to the input luminance signal Yin, on the basis of the second reference luminance level Yb2 that is supplied from the outside, and outputs the gamma correction signal Gs to the multiplication circuit 106.

Figure 5:
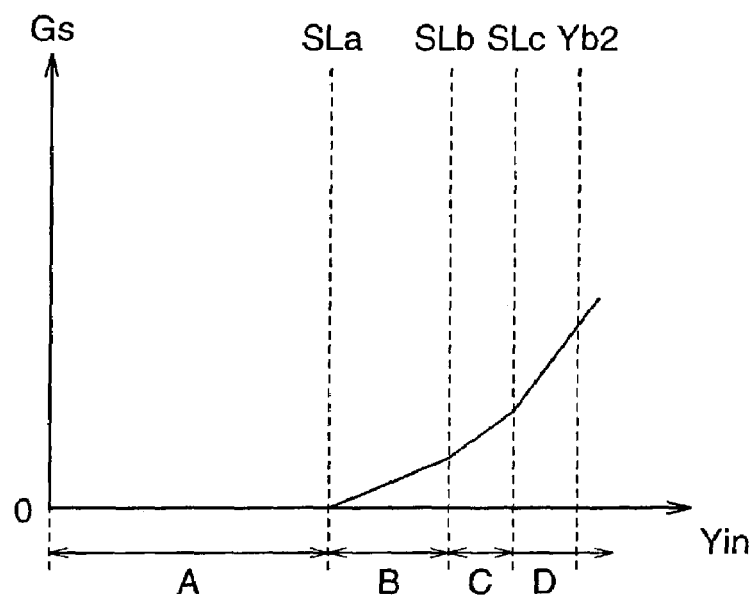
FIG. 5 is a diagram illustrating the relationship between an input luminance signal Yin and a gamma correction signal Gs in a gamma correction signal generation circuit of the gradation correction device according to the first embodiment.

FIG. 5 shows the relationship between the input luminance signal Yin and the gamma correction signal Gs which is generated by the gamma correction signal generation circuit 105. In FIG. 5, the x-axis indicates the value of the input luminance signal Yin, and the y-axis indicates the value of the gamma correction signal Gs. On the x-axis, slice levels SLa, SLb, and SLc (SLa<SLb<SLc), which are determined on the basis of the second reference luminance level Yb2, are set. Based on these slice levels SLa, SLb, and SLc, the gamma correction signal generation circuit 105 outputs the gamma correction signal Gs for the input luminance signal Yin, as a polygonal-line characteristic shown in FIG. 5. The gamma correction signal Gs is obtained by Gs=g (Yin), and the function g(Yin) is, for example, represented by, $$g(Yin) = 0$$

where $(Yin \leq SLa)$ \qquad (4)

$$g(Yin) = Yin - SLa$$

where $(SLa < Yin \leq SLb)$ \qquad (5)

$$g(Yin) = (Yin - SLa) + (Yin - SLb)$$

where $(SLb < Yin \leq SLc)$ \qquad (6)

$$g(Yin) = (Yin - SLa) + (Yin - SLb) + (Yin - SLc) \qquad (7)$$

where (SLc<Y)

Figure 6:
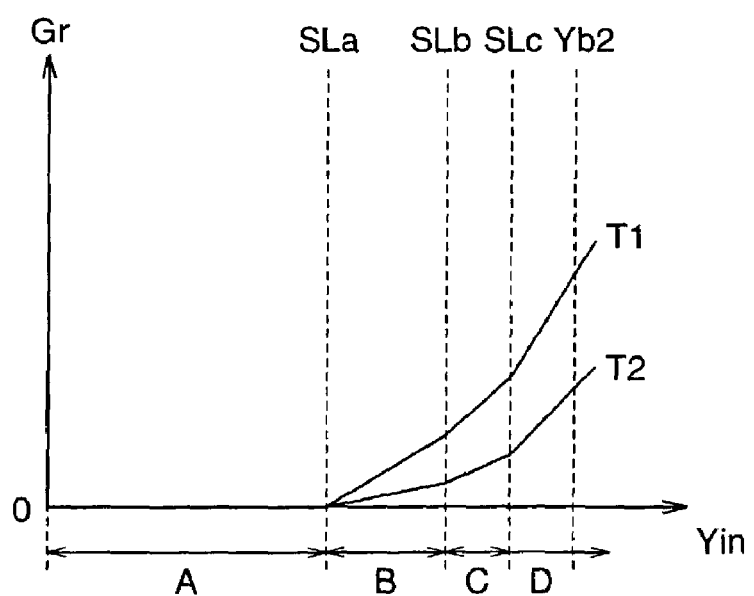
FIG. 6 is a diagram illustrating the relationship between a gamma correction amount Gr and an input luminance signal Yin in the gradation correction device according to the first embodiment.

That is, the gamma correction signal Gs is obtained by formula (4) when the level of the input luminance signal Yin is in an area A shown in FIG. 6, by formula (5) when the level of the Yin is in an area B, by formula (6) when the level of the Yin is in an area C, and by formula (7) when the level of the Yin is in an area D.

In this way, the difference values between the input luminance signal Yin and the slice levels SLa, SLb, and SLc are obtained, and the respective difference values are added, whereby the gamma correction signal Gs for the input luminance signal Yin can be obtained as the polygonal-line characteristic shown in FIG. 5. While in this embodiment the three slice levels are obtained on the basis of the second reference luminance level Yb2, these slice levels may be supplied from the outside. Furthermore, while the gamma correction signal Gs is obtained using the three points of slice levels, it may be obtained using more or less than three points of slice levels.

In step S205, the multiplication circuit 106 multiplies the gamma correction signal Gs by the correction gain Hg to obtain a gamma correction amount Gr, and outputs it to the second subtraction circuit 107.

FIG. 6 is a diagram illustrating the relationship between the gamma correction amount Gr and the input luminance signal Yin. In FIG. 6, a polygonal-line characteristic T1 is obtained when the correction gain Hg is relatively large, and a polygonal-line characteristic T2 is obtained when the correction gain Hg is relatively small. As is evident from FIG. 6, the larger the correction gain Hg is, the larger the value of the gamma correction amount Gr becomes.

In step S206, the second subtraction circuit 107 subtracts the gamma correction amount Gr from the input luminance signal Yin to obtain the result as an output luminance signal Yo.

Figure 7:
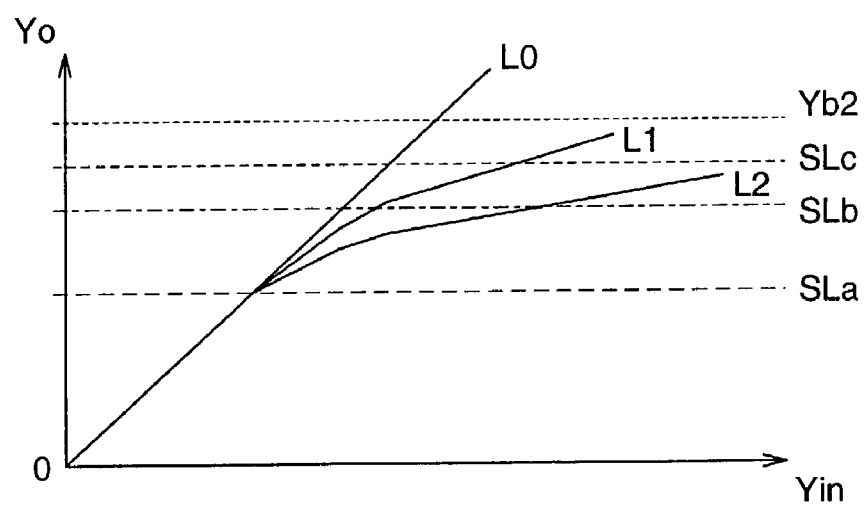
FIG. 7 is a diagram illustrating the relationship between an input luminance signal Yin and an output luminance signal Yo in the gradation correction device according to the first embodiment.

FIG. 7 is a diagram illustrating the relationship between the input luminance signal Yin and the output luminance signal Yo. In FIG. 7, an I/O characteristic L0 is obtained when the input luminance signal Yin is not subjected to gamma correction, an I/O characteristic L1 is obtained when the signal Yin is subjected to gamma correction weakly, and an I/O characteristic L2 is obtained when the signal Yin is subjected to gamma correction strongly. As is evident from FIG. 7, the white-side gradation of the output luminance signal Yo outputted from the second subtraction circuit 107 is suppressed by the gamma correction. Further, the output luminance level Yo is outputted from the second subtraction circuit 107 by digital feedback control such that the maximum output luminance level Ymax becomes equal to the first reference luminance level Yb1.

The output luminance signal Yo so obtained is again captured by the maximum output luminance level detection circuit 101 in step S200, and thus feedback control is carried out.

The process shown in FIG. 2 is desired to be completed, timing-wise, within one vertical sync period to realize highly-accurate feedback.

While in this embodiment the correction gain adjustable amount generation circuit 103 and the correction gain generation circuit 104 are described as separated block circuits, these circuits may be implemented by using a common arithmetic processing circuit such as a CPU.

According to the first embodiment, the gradation correction device is provided with the correction gain adjustable amount generation circuit 103 and the correction gain generation circuit 104, and the correction gain adjustable amount generation circuit 103 generates a correction gain adjustable amount that makes a non-linear, accelerating, and monotonous increase with respect to the difference S between the reference luminance level Yb1 and the maximum luminance level as shown in FIG. 4, and greater gamma correction is carried out as the value of the difference is larger. Therefore, digital feedback control, in which the maximum output luminance level Ymax and the first reference luminance level Yb1 can be made equal to each other with high responsivity, is realized, and gamma correction, which is one of gradation corrections that have conventionally been performed in analog feedback control, can be realized by digital feedback control.

MODIFICATION OF EMBODIMENT 1

Figure 8:
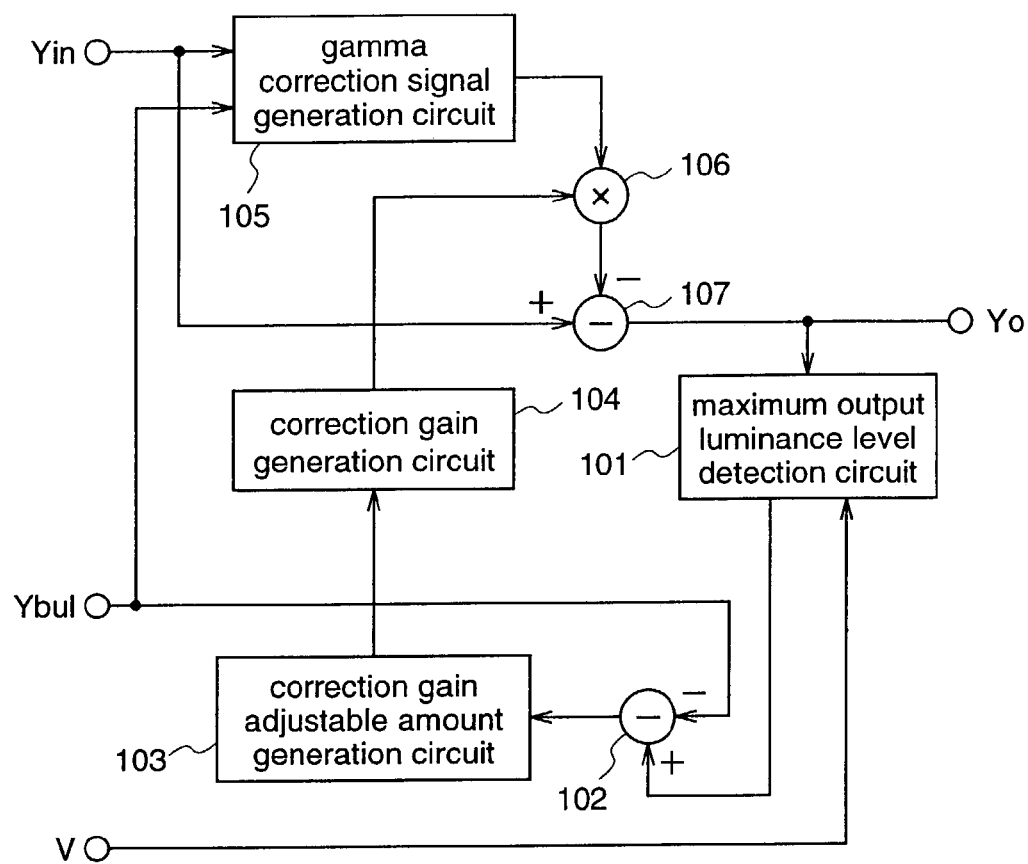
FIG. 8 is a block diagram illustrating the construction of a gradation correction device according to a modification of the gradation correction device according to the first embodiment.

FIG. 8 is a block diagram illustrating a gradation correction device according to a modification of the first embodiment. The gradation correction device shown in FIG. 8 is different from the gradation correction device shown in FIG. 1 in that a blooming luminance level Ybu1 that is a luminance level at which blooming of an image occurs is employed instead of the first reference luminance level Yb1 and the second reference luminance level Yb2. The operating principles of the respective constituents are identical to those described for the gradation correction device shown in FIG. 1 and, therefore, repeated description is not necessary.

Since the so-constructed gradation correction device shown in FIG. 8 employs the blooming luminance level Ybu1, the maximum output luminance level Ymax of the output luminance signal Yo is prevented from being higher than the blooming luminance level Ybu1, whereby effective gradation correction which reduces "blooming" as a phenomenon unique to the CRT can be carried out.

The gradation correction device according to the first embodiment may be constructed such that the first reference luminance level Yb1 and the second reference luminance level Yb2 are arbitrarily set from the outside. In this construction, the first reference luminance level Yb1 and the second reference luminance level Yb2 can be adjusted while monitoring the actual image in the manufacture stage, whereby the effect of improper gamma correction can be controlled, resulting in an image faithful to the transmitted image.

While in the modification of this embodiment both of the first reference luminance level Yb1 and the second reference luminance level Yb2 are replaced with the blooming luminance level Ybu1, only the first reference luminance level Yb1 may be replaced with the blooming luminance level Ybu1, or only the second reference luminance level Yb2 may be replaced with the blooming luminance level Ybu1. Thereby, the correction characteristic can be changed according to the user operation, and gamma correction suited to the preference of the user can be carried out. When such construction is employed, the other luminance level that is not set at the blooming luminance level must be set at a level lower than the blooming level to prevent the gamma correction processing from failing.

EMBODIMENT 2

Figure 9:
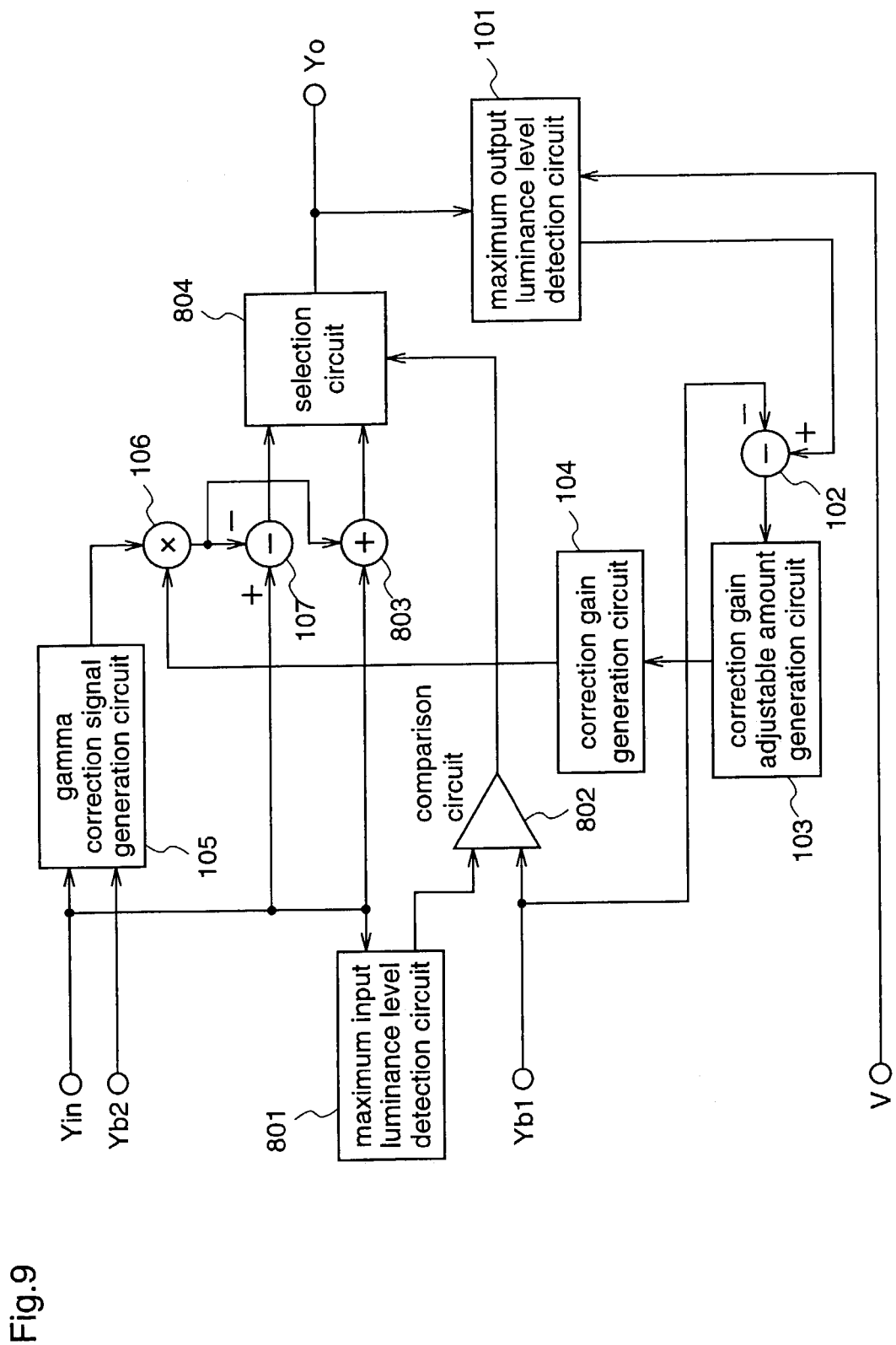
FIG. 9 is a block diagram illustrating the construction of a gradation correction device according to a second embodiment of the present invention.

FIG. 9 is a block diagram illustrating the construction of a gradation correction device according to a second embodiment of the present invention. The gradation correction device shown in FIG. 9 is provided with, in addition to the constituents of the gradation correction device shown in FIG. 1, a maximum input luminance level detection circuit 801 for detecting a maximum input luminance level from the input luminance signal Yin; a comparison circuit 802 for comparing the output of the maximum input luminance level detection circuit 801 and the first reference luminance level Yb1; an addition circuit 803 for adding the input luminance signal Yin and the output of the multiplication circuit 106; and a selection circuit 804 for selecting either the output of the subtracter 107 or the output of the adder 803.

Hereinafter, the operation of the gradation correction device so constructed will be described.

The maximum input luminance level detection circuit 801 detects a maximum input luminance level Ymax2 within one field of the input luminance signal Yin, and outputs it to the comparison circuit 802. As for the maximum input luminance level Ymax2, a maximum luminance level within several fields of the input luminance signal Yin may be obtained.

The comparison circuit 802 compares the maximum input luminance level Ymax2 with the first reference luminance level Yb1, and outputs the result of the comparison to the selection circuit 804.

The addition circuit 803 adds the gamma correction amount Gr outputted from the multiplication circuit 106, to the input luminance signal Yin, and outputs the sum to the selection circuit 804.

Based on the result of the comparison by the comparison circuit 802, the selection circuit 804 selects the output of the second subtraction circuit 107 when the maximum input luminance level Ymax2 is higher than the first reference luminance level Yb1, or selects the output of the addition circuit 803 when the maximum input luminance level Ymax2 is lower than the first reference luminance level Yb1, and outputs the selected signal as an output luminance signal Yo.

The constituents other than described above are identical to those shown in FIG. 1 and, therefore, repeated description is not necessary.

Figure 10:
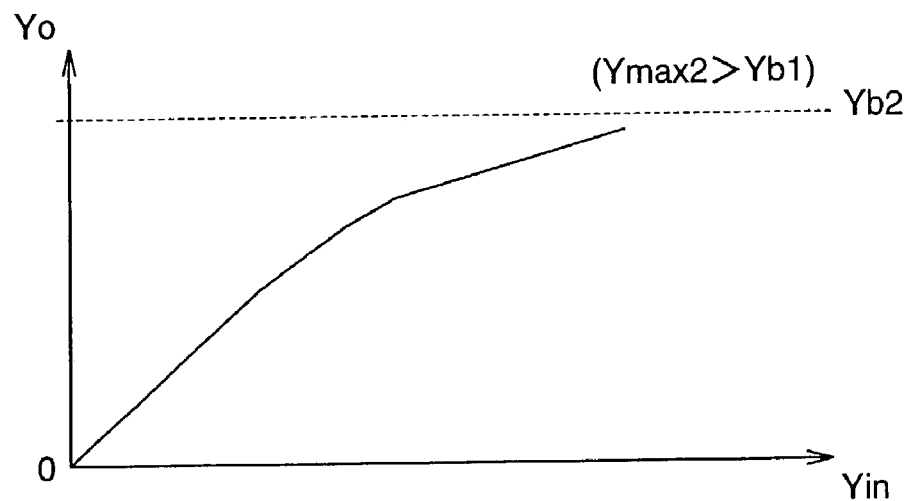
FIG. 10($a$) is a diagram illustrating the relationship between an input luminance signal Yin and an output luminance signal Yo according to the second embodiment (in the case where Ymax2>Yb1).
Figure 10:
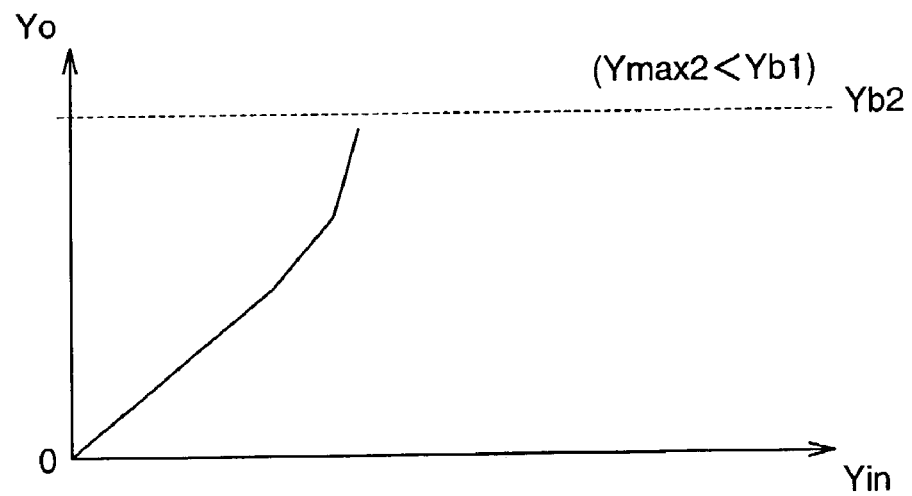

FIG. 10(*a*) is a diagram illustrating the relationship between the input luminance signal Yin and the output luminance signal Yo when the maximum input luminance level Ymax2 is higher than the first reference luminance level Yb1 (Ymax2>Yb1). When the maximum input luminance level Ymax2 is higher than the first reference luminance level Yb1, the selection circuit 804 selects the output of the second subtraction circuit 107, which output is obtained by subtracting the gamma correction amount Gr from the input luminance signal Yin, and therefore, gamma correction functions so as to suppress the white-side gradation of the luminance signal as shown in FIG. 10(*a*).

On the other hand, FIG. 10(*b*) is a diagram illustrating the relationship between the input luminance signal Yin and the output luminance signal Yo when the maximum input luminance level Ymax2 is lower than the first reference luminance level Yb1 (Ymax2<Yb1). When the maximum input luminance level Ymax2 is lower than the first reference luminance level Yb1, the selection circuit 804 selects the output of the addition circuit 803, which output is obtained by adding the gamma correction amount Gr to the input luminance signal Yin, and therefore, gamma correction functions as inverse gamma correction for expanding the whiteside gradation of the luminance signal as shown in FIG. 10(*b*).

As described above, the gradation correction device according to the second embodiment is provided with the maximum input luminance level detection circuit 801 and the comparison circuit 802 for comparing the maximum input luminance level with the first reference luminance level, whereby gamma correction for suppressing the white-side gradation of the luminance signal can be carried out according to the result of the comparison between the input luminance signal and the first reference luminance level. Further, when the maximum input luminance level is lower than the reference value, it is judged that the white-side luminance level has a margin, and inverse gamma correction for expanding the white-side gradation is also carried out. Therefore, the white-side dynamic range of the image signal can be increased, resulting in a clearer and more dynamic image.

EMBODIMENT 3

Figure 11:
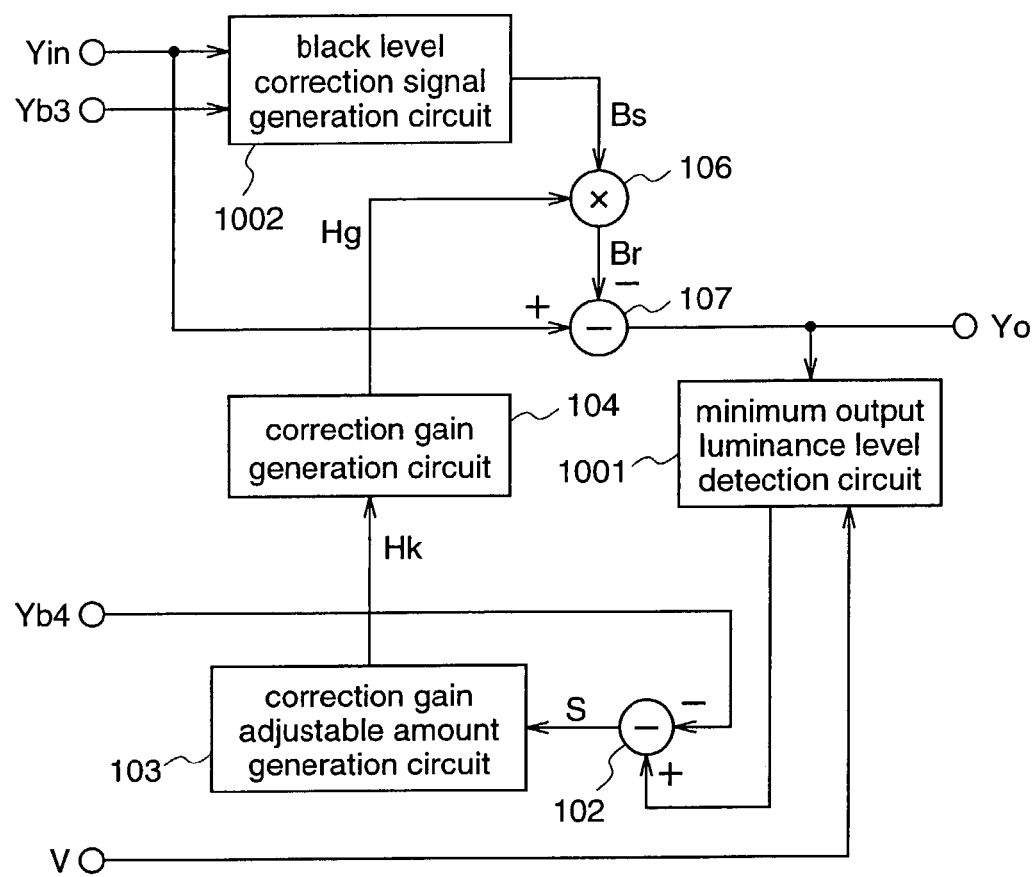
FIG. 11 is a block diagram illustrating the construction of a gradation correction device according to a third embodiment of the present invention.

FIG. 11 is a block diagram illustrating the construction of a gradation correction device according to a third embodiment of the present invention. The gradation correction device shown in FIG. 11 is provided with a minimum output luminance level detection circuit 1001 instead of the maximum output luminance level detection circuit 101 in the gradation correction device shown in FIG. 1, and further, it is provided with a black level correction signal generation circuit 1002 instead of the gamma correction signal generation circuit 105 shown in FIG. 1. The black level correction signal generation circuit 1002 receives a third reference luminance level Yb3 which is supplied as an input from the outside, and the first subtraction circuit 102 receives a fourth reference luminance level Yb4 which is supplied as an input from the outside. Usually, the third and fourth reference luminance levels have the relationship of Yb3>Yb4.

Hereinafter, the operation of the gradation correction device so constructed will be described.

The minimum output luminance level detection circuit 1001 detects a minimum output luminance level Ymin within one field of the output luminance signal Yo, and outputs it to the first subtraction circuit 102. As for the minimum output luminance level Ymin, a minimum luminance level within several fields of the output luminance signal Yo may be obtained.

The first subtraction circuit 102 calculates a difference value S2 between the minimum output luminance level Ymin and the fourth reference luminance level Yb4 as follows, $$S2 = Ymin - Yb4 \qquad (8)$$

and outputs it to the correction gain adjustable amount generation circuit 103.

The correction gain adjustable amount generation circuit 103 performs control such that the adjustable amount Hk of the correction gain Hg is increased as the absolute value |S2| of the difference S2 becomes larger, and the adjustable amount Hk of the correction gain Hg is decreased as the absolute value |S2| becomes smaller, and outputs the adjustable amount Hk to the correction gain generation circuit 104. At this time, the plus or minus sign of the difference value S is also sent to the correction gain generation circuit 104. Since the method for generating the adjustable amount Hk is identical to that described for the first embodiment, repeated description is not necessary.

The correction gain generation circuit 104 generates a new correction gain Hg by adding or subtracting the adjustable amount Hk to/from the current correction gain Hg, according to the result of comparison between the minimum output luminance level Ymin and the fourth reference luminance level Yb4, and outputs it to the multiplication circuit 106. That is, when the minimum output luminance level Ymin is higher than the fourth reference luminance level Yb4, the correction gain generation circuit 104 obtains the correction gain Hg by, $$Hg = Hg - Hk \qquad (9)$$

so that the correction gain is decreased. Conversely, when the minimum output luminance level Ymin is lower than the fourth reference luminance level Yb4, the correction gain generation circuit 104 obtains the correction gain Hg by, $$Hg = Hg + Hk \qquad (10)$$

so that the correction gain is increased.

Figure 12:
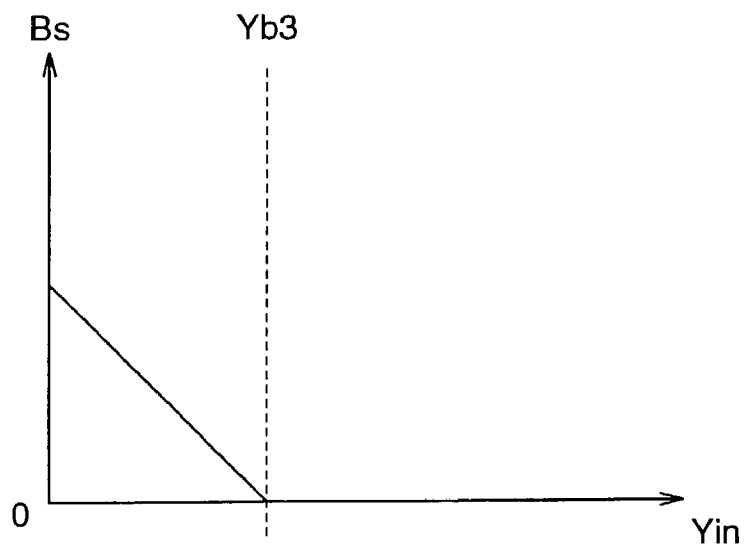
FIG. 12 is a diagram illustrating the relationship between an input luminance signal Yin and a black level correction signal Bs in a black level correction signal generation circuit of the gradation correction device according to the third embodiment.

The black level correction signal generation circuit 1002 obtains a black level correction signal Bs corresponding to the input luminance signal Yin on the basis of the third reference luminance level Yb3, and outputs it to the multiplication circuit 106. FIG. 12 is a diagram illustrating the relationship between the input luminance signal Yin and the black level correction signal Bs obtained by the black level correction signal generation circuit 1002. In FIG. 12, the x-axis indicates the input luminance signal Yin while the y-axis indicates the value of the black level correction signal Bs. On the x-axis, the third reference luminance level Yb3 is set. The black level correction signal generation circuit 1002 obtains the black level correction signal Bs for the input luminance signal Yin, by Bs=b(Yin), on the basis of the third reference luminance level Yb3. For example, the function b(Yin) is represented by, $$b(Yin) = Yb3 - Yin$$

where $(Yin \leq Yb3)$ (8)

The multiplication circuit 106 multiplies the black level correction signal Bs by the correction gain Hg to obtain a black level correction amount Br, and outputs it to the second subtraction circuit 107.

Figure 13:
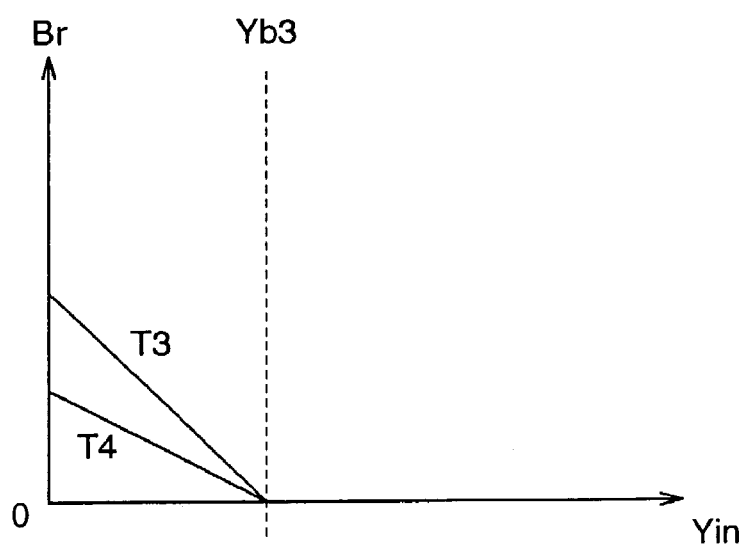
FIG. 13 is a diagram illustrating the relationship between a black level correction amount Br and an input luminance signal Yin in the gradation correction device according to the third embodiment.

FIG. 13 is a diagram illustrating the relationship between the black level correction amount Br and the input luminance signal Yin. In FIG. 13, a straight-line characteristic T3 is obtained when the correction gain Hg is relatively large, and a straight-line characteristic T4 is obtained when the correction gain Hg is relatively small. As is evident from FIG. 13, the larger the correction gain Hg is, the larger the value of the black level correction amount Br becomes.

Figure 14:
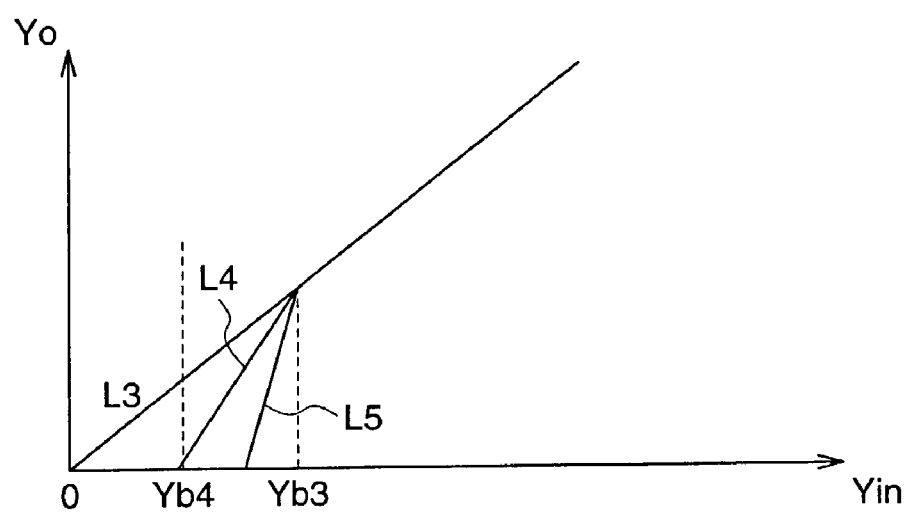
FIG. 14 is a diagram illustrating the relationship between an input luminance signal Yin and an output luminance signal Yo in the gradation correction device according to the third embodiment.

Then, the second subtraction circuit 107 subtracts the black level correction amount Br from the input luminance signal Yin to obtain an output luminance signal Yo. FIG. 14 is a diagram illustrating the relationship between the input luminance signal Yin and the output luminance signal Yo. In FIG. 14, an I/O characteristic L3 is obtained when the input luminance signal Yin is not subjected to correction, an I/O characteristic L4 is obtained when the input signal Yin is subjected to black level correction weakly, and an I/O characteristic L5 is obtained when the input signal Yin is subjected to black level correction strongly. As is evident from FIG. 14, the black-side gradation of the output luminance signal Yo outputted from the second subtraction circuit 107 is expanded by the black level correction. Further, the output luminance signal Yo is outputted from the second subtraction circuit 107 by digital feedback control such that the minimum output luminance level Ymin becomes equal to the fourth reference luminance level Yb4.

While in this embodiment the correction gain adjustable amount generation circuit 103 and the correction gain generation circuit are shown as separated block circuits, these circuits may be implemented by using a common arithmetic processing circuit such as a CPU.

As described above, the gradation correction device according to the third embodiment is provided with the correction gain adjustable amount generation circuit 103 and the correction gain generation circuit 104 as in the first embodiment. Therefore, the gradation correction device can perform digital feedback control such that the maximum output luminance level Ymin becomes equal to the fourth reference luminance level Yb4 with high responsivity, whereby black level correction, which is one of gradation corrections that have conventionally been performed in analog feedback control, can be realized by digital feedback control.

The third reference luminance level Yb3 and the fourth reference luminance level Yb4 according to the third embodiment may be arbitrarily set from the outside. In this case, the third reference luminance level Yb3 and the fourth reference luminance level Yb4 can be adjusted while monitoring the actual image in the manufacture stage, whereby the effect of improper black level correction is controlled, and a fine picture can be created.

EMBODIMENT 4

Figure 15:
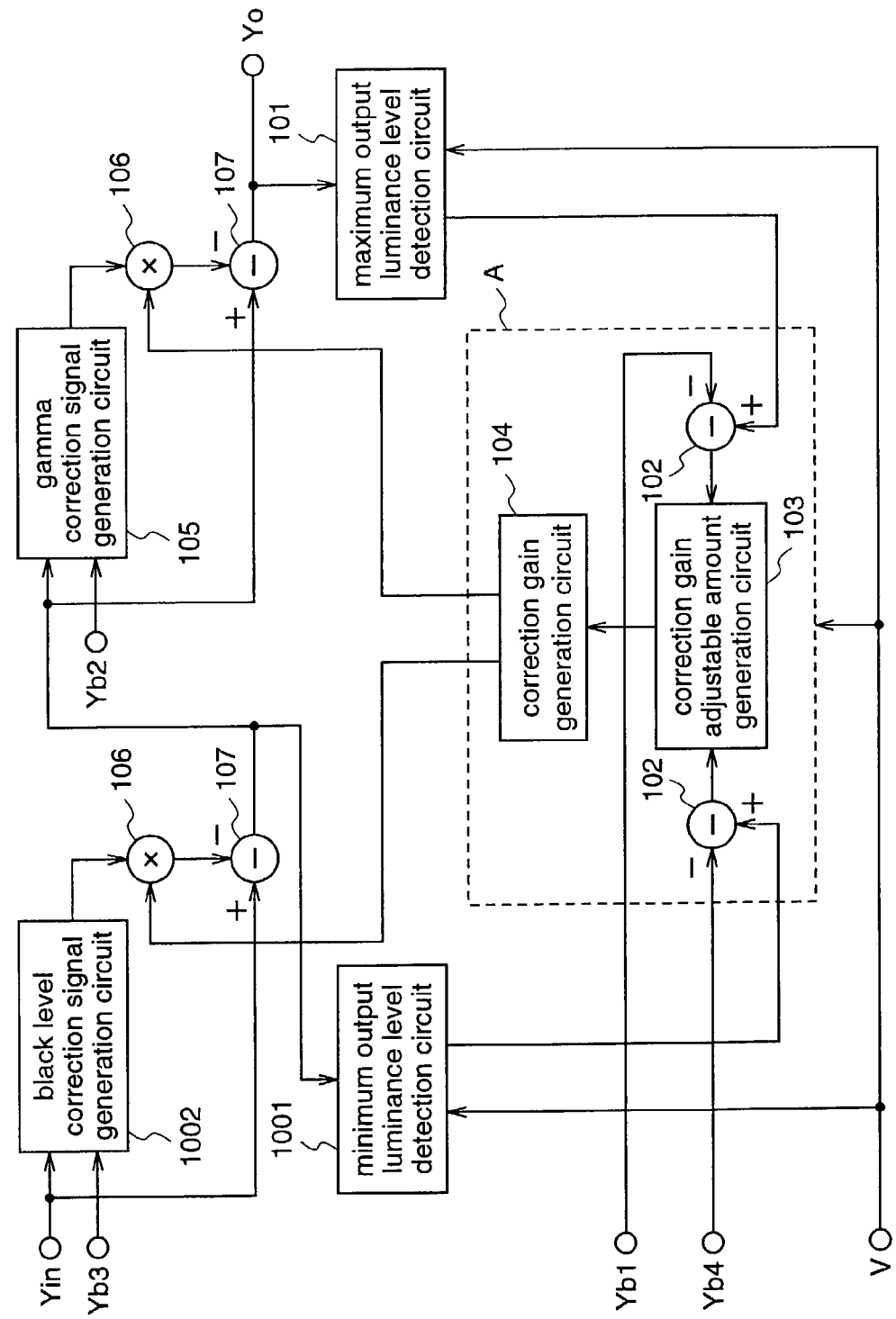
FIG. 15 is a block diagram illustrating the construction of a gradation correction device according to a fourth embodiment of the present invention.

FIG. 15 is a block diagram illustrating the construction of a gradation correction device according to a fourth embodiment of the present invention. The gradation correction device shown in FIG. 15 is provided with both of the gamma correction mechanism of the gradation correction device shown in FIG. 1 and the black level correction mechanism shown in FIG. 11. To be specific, in the gradation correction device shown in FIG. 15, after subjecting the input luminance signal Yin to black level correction for expanding the black-side gradation, the black-level-corrected luminance signal is subjected to gamma correction for suppressing the white-side gradation, thereby obtaining an output luminance signal Yo.

Figure 16:
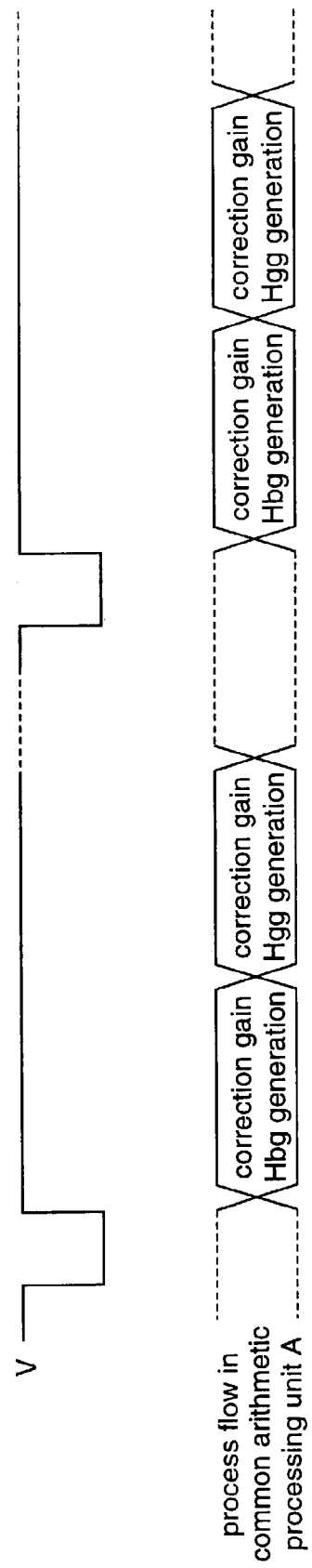
FIG. 16 is a diagram for explaining an example of a method for obtaining correction gains Hbg and Hgg by time division, in the gradation correction device according to the fourth embodiment.

In FIG. 15, reference character A denotes a common arithmetic processing unit including the first subtraction circuit 102, the correction gain adjustable amount generation circuit 103, and the correction gain generation circuit 104 which are shown in FIGS. 1 and 11. In the common arithmetic processing unit A, a correction gain Hbg for black level correction and a correction gain Hgg for gamma correction are obtained by time-division processing. FIG. 16 shows an example of a method for obtaining the correction gains Hbg and Hgg by time-division processing. That is, the common arithmetic processing unit A repeats a series of arithmetic processing for obtaining new correction gains Hbg and Hgg at the timing of a vertical sync signal V.

While in this embodiment the vertical sync signal V is used as a timing pulse for performing time-division processing, other timing pulses such as a horizontal sync signal may be used.

Figure 17:
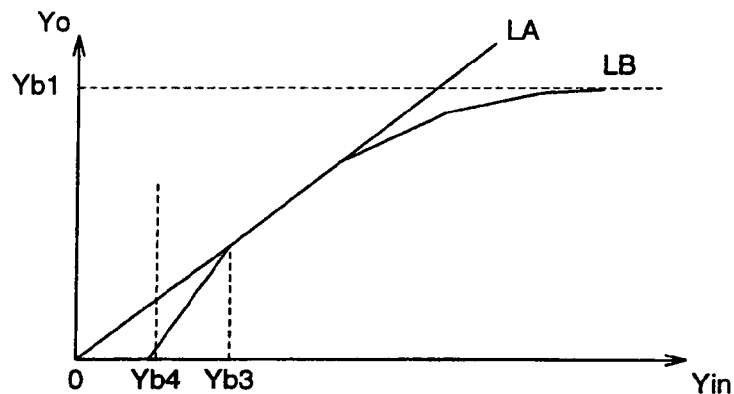
FIG. 17 is a diagram illustrating the relationship between an input luminance signal Yin and an output luminance signal Yo in the gradation correction device according to the fourth embodiment.
Figure 18:
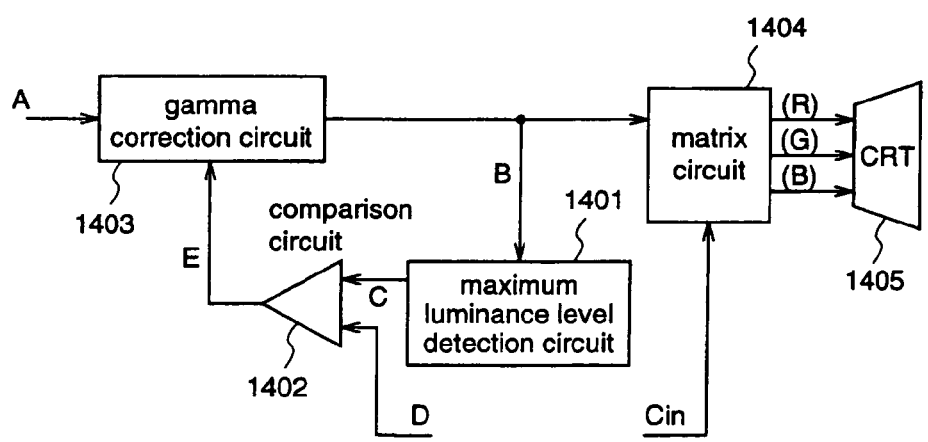
FIG. 18 is a block diagram illustrating the construction of a conventional gradation correction device for a luminance signal.
Figure 19:
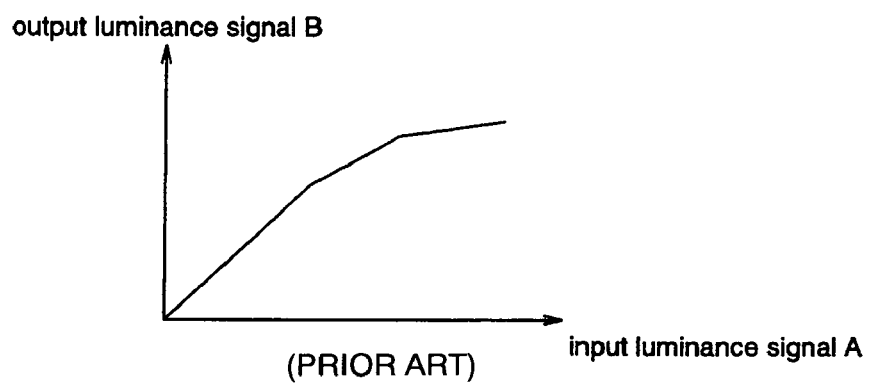
FIG. 19($a$) is a diagram illustrating the I/O characteristic of the conventional gradation correction device for a luminance signal (in the case where maximum luminance level C>reference luminance level D).
Figure 19:
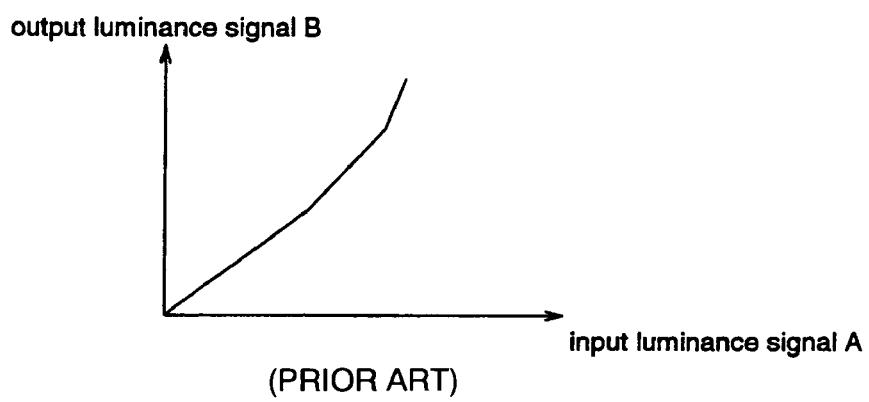

FIG. 17 is a diagram illustrating the relationship between the input luminance signal Yin and the output luminance signal Yo. In FIG. 17, an I/O characteristic LA is obtained when no correction is carried out, and an I/O characteristic LB is obtained when both of black level correction and gamma level correction are carried out. With reference to FIG. 17, when the input luminance signal Yin is small, i.e., when the luminance level is low, black level correction is carried out to obtain the output luminance signal Yo in which the black-side gradation is expanded. On the other hand, when the input luminance signal Yin is large, i.e., when the luminance level is high, gamma correction is carried out to suppress the white-side gradation.

In the so-constructed gradation correction device according to the fourth embodiment, both of black-side and white-side gradation corrections can be performed on the input luminance signal Yin, resulting in an image which is clearer and more dynamic than that obtained by the second or third embodiment.

While in this fourth embodiment gamma correction is carried out after performing black level correction, gamma correction may be performed first and then the gamma-corrected-signal may be subjected to black level correction. Also in this case, the same effects as mentioned above are achieved.

APPLICABILITY IN INDUSTRY

In a gradation correction device for performing gradation correction on a luminance signal of an image, digital feedback correction is performed with high accuracy, whereby, for example, gamma correction, which is one of gradation corrections in a video signal processing in digital fashion, can be realized.

The invention claimed is:

1. A gradation correction device for correcting an input luminance signal of an image according to an output luminance signal so that an output having a predetermined characteristic in relation to the input luminance signal can be obtained, said device comprising:
   a maximum output luminance level detection means for detecting a maximum output luminance level of the output luminance signal which has already been gradation-corrected;
   a first subtraction means for calculating a difference value between the maximum output luminance level which is outputted from the maximum output luminance level detection means, and a first reference luminance level which is supplied from the outside;
   a correction gain adjustable amount generation means for outputting a predetermined adjustable amount according to the difference value, on the basis of a characteristic curve such that a change in the adjustable amount to be outputted is increased as the absolute value of the difference value outputted from the first subtraction means becomes larger;
   a correction gain generation means for adding or subtracting the adjustable amount outputted from the correction gain adjustable amount generation means to/from the current correction gain, and outputting the result as a correction gain;
   a gamma correction signal generation means for generating a gamma correction signal for the input luminance signal, on the basis of a second reference luminance level which is supplied from the outside;
   a multiplication means for multiplying the gamma correction signal outputted from the gamma correction signal generation means by the correction gain outputted from the correction gain generation means, and outputting the result as a gamma correction amount; and
   a second subtraction means for subtracting the gamma correction amount outputted from the multiplication means, from the input luminance signal, thereby performing gamma correction on the input luminance signal.

2. A gradation correction device as defined in claim 1, wherein a blooming luminance level that is a luminance level at which an image displayed on an image receiving tube blooms is employed as the first reference luminance level and the second reference luminance level.

3. A gradation correction device as defined in claim 1 further comprising:
   a maximum input luminance level detection means for detecting a maximum luminance level of the input luminance signal;
   a comparison means for comparing the maximum input luminance level outputted from the maximum input luminance level detection means, with the first reference luminance level;
   an addition means for adding the gamma correction amount outputted from the multiplication means to the input luminance signal, thereby performing gamma correction on the input luminance signal; and
   an output selection means for selecting either the output of the second subtraction means or the output of the addition means according to the result of the comparison by the comparison means, and outputting the selected one;
   wherein, when the maximum input luminance level is larger than the first reference luminance level in the comparison means, the output of the second subtraction means is selected by the selection means and outputted to perform gamma correction; on the other hand, when the maximum input luminance level is smaller than the first reference luminance level, the output of the addition means is selected by the selection means and outputted to perform inverse gamma correction for expanding the white-side gradation of the luminance signal.

4. A gradation correction device as defined in claim 1 further comprising:
   a minimum output luminance level detection means for detecting a minimum output luminance level of the output luminance signal which has already been gradation-corrected;
   a third subtraction means for calculating a difference value between the minimum output luminance level which is outputted from the minimum output luminance level detection means, and a third reference luminance level which is supplied from the outside;
   a black level correction signal generation means for generating a black level correction signal for the input luminance signal outputted from the second subtraction means, on the basis of a fourth reference luminance level which is supplied from the outside;
   a second multiplication means for multiplying a second correction gain which is obtained by the correction gain adjustable amount generation means and the correction gain generation means, by the output of the black level correction signal generation means, on the basis of the absolute value of the difference value which is outputted from the third subtraction means; and
   a fourth subtraction means for subtracting the output of the second multiplication means from the output of the second subtraction means, thereby performing black level correction on the luminance signal which has already been gamma-corrected.

5. A gradation correction device for correcting an input luminance signal of an image according to an output luminance signal so that an output having a predetermined characteristic in relation to the input luminance signal can be obtained, said device comprising:
   a minimum output luminance level detection means for detecting a minimum output luminance level of the output luminance signal which has already been gradation-corrected;
   a first subtraction means for calculating a difference value between the minimum output luminance level which is outputted from the minimum output luminance level detection means, and a first reference luminance level which is supplied from the outside;
   a correction gain adjustable amount generation means for outputting a predetermined adjustable amount according to the difference value, on the basis of a characteristic curve such that a change in the adjustable amount to be outputted is increased as the absolute value of the difference value outputted from the first subtraction means becomes larger;
   a correction gain generation means for adding or subtracting the adjustable amount outputted from the correction gain adjustable amount generation means to/from the current correction gain, and outputting the result as a correction gain;
   a black level correction signal generation means for generating a black level correction signal for the input luminance signal, on the basis of a second reference luminance level which is supplied from the outside;

a multiplication means for multiplying the black level correction signal outputted from the black level correction signal generation means, by the correction gain outputted from the correction gain generation means, and outputting the result as a black level correction amount; and a second subtraction means for subtracting the black level correction amount outputted from the multiplication means, from the input luminance signal, thereby performing black level correction on the input luminance signal.

6. A gradation correction device as defined in claim 4 further comprising:

a maximum output luminance level detection means for detecting a maximum output luminance level of the output luminance signal which has already been gradation-corrected;

a third subtraction means for calculating a difference value between the maximum output luminance level which is outputted from the maximum output luminance level detection means, and a third reference luminance level which is supplied from the outside;

a gamma correction signal generation means for generating a gamma correction signal for the luminance signal which is outputted from the second subtraction means, on the basis of a fourth reference luminance level which is supplied from the outside;

a second multiplication means for multiplying a second correction gain which is obtained by the correction gain adjustable amount generation means and the correction gain generation means, by the output of the gamma correction signal generation means, on the basis of the absolute value of the difference value which is outputted from the third subtraction means; and a fourth subtraction means for subtracting the output of the second multiplication means from the output of the second subtraction means, thereby performing gamma correction on the luminance signal whose black level has already been corrected.

* * * * *

UNITED STATES PATENT AND TRADEMARK OFFICE
CERTIFICATE OF CORRECTION

PATENT NO. : 7,034,896 B2  Page 1 of 1
APPLICATION NO. : 10/343512
DATED : April 25, 2006
INVENTOR(S) : Keiichi Ito and Atsuhisa Kageyama It is certified that error appears in the above-identified patent and that said Letters Patent is hereby corrected as shown below:

On the title page insert:

(30)  Foreign Priority Application Data

May 31, 2001   (JP)   2001-164941

Signed and Sealed this

Second Day of January, 2007

JON W. DUDAS
*Director of the United States Patent and Trademark Office*